United States Patent [19]
George

[11] Patent Number: 5,644,196
[45] Date of Patent: Jul. 1, 1997

[54] BEAM LANDING LOCATION ERROR CORRECTION ARRANGEMENT

[75] Inventor: John Barrett George, Carmel, Ind.

[73] Assignee: Thomson Consumer Electronics, Inc., Indianapolis, Ind.

[21] Appl. No.: 481,539
[22] PCT Filed: Dec. 8, 1993
[86] PCT No.: PCT/US93/11995
  § 371 Date: Jul. 7, 1995
  § 102(e) Date: Jul. 7, 1995
[87] PCT Pub. No.: WO95/16273
  PCT Pub. Date: Jun. 15, 1995
[51] Int. Cl.[6] .................. G09G 1/28; H01J 29/51
[52] U.S. Cl. .................. 315/368.18; 315/368.11; 315/368.17; 315/370
[58] Field of Search .................. 315/368.11, 368.17, 315/368.18, 368.21, 368.28, 370

[56] References Cited

U.S. PATENT DOCUMENTS

| | | | |
|---|---|---|---|
| 3,953,760 | 4/1976 | Matsuura et al. | 315/13 C |
| 4,318,032 | 3/1982 | Kureha | 315/368 |
| 4,395,662 | 7/1983 | Sexton, Jr. | 315/371 |
| 4,500,816 | 2/1985 | Murphy | 315/368 |
| 4,560,910 | 12/1985 | Midland | 315/382 |
| 4,675,580 | 6/1987 | Dietz | 315/371 |
| 4,814,671 | 3/1989 | Oguino | 315/370 |
| 5,034,664 | 7/1991 | Fernsler et al. | 315/370 |
| 5,138,238 | 8/1992 | Truskalo | 315/368.18 |
| 5,218,275 | 6/1993 | Truskalo | 315/368.21 |

*Primary Examiner*—Gregory C. Issing
*Attorney, Agent, or Firm*—Joseph S. Tripoli; Joseph J. Laks; Sammy S. Henig

[57] ABSTRACT

A differentiation network differentiates a retrace pulse signal to produce a narrower pulse during the first half of retrace that is coupled to an input of a convergence amplifier. The convergence amplifier is coupled to a convergence winding to produce a convergence current. The narrower pulse produces an overshoot at the amplifier input and, thereby, speeds up the response time to the convergence amplifier.

8 Claims, 4 Drawing Sheets

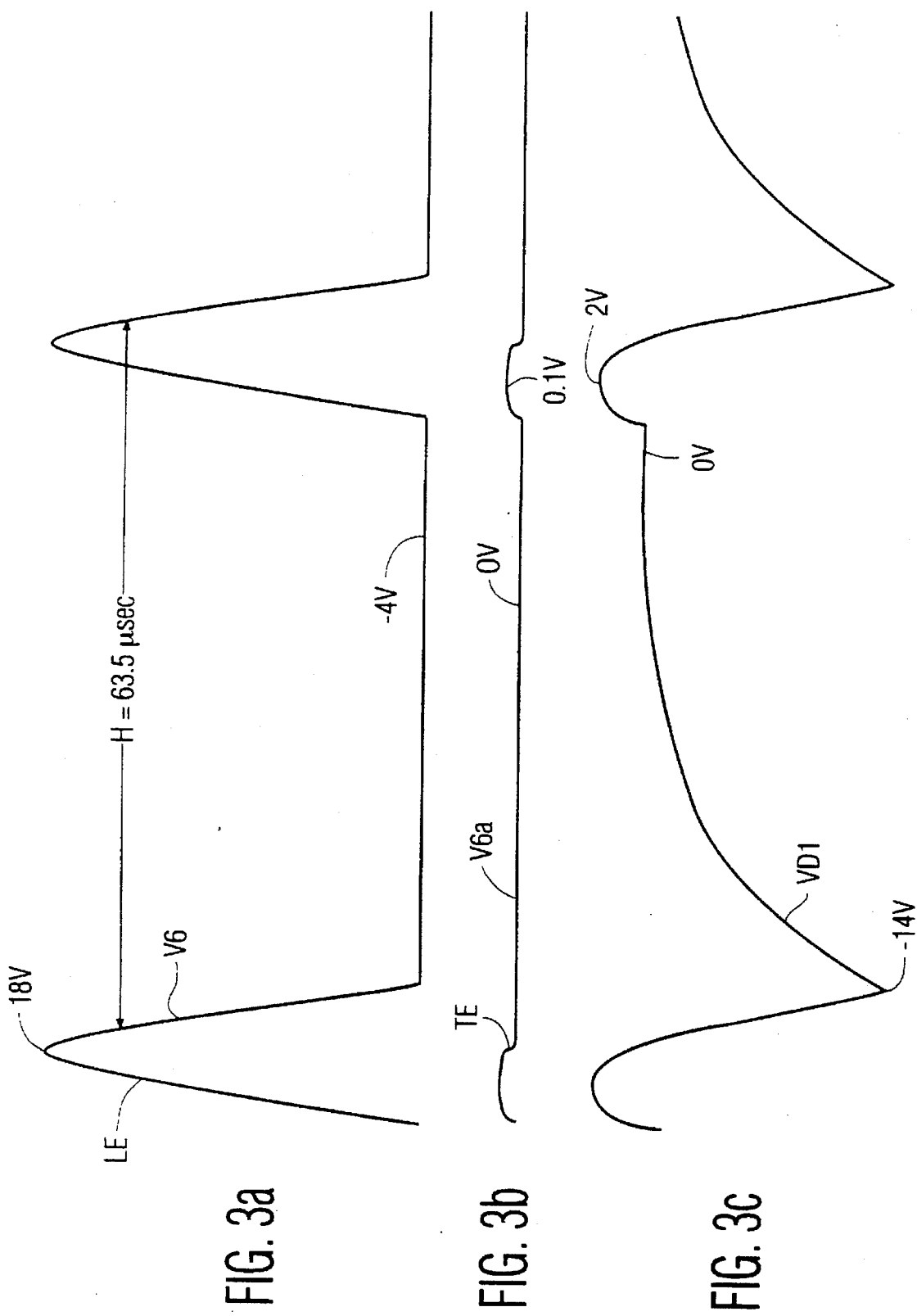

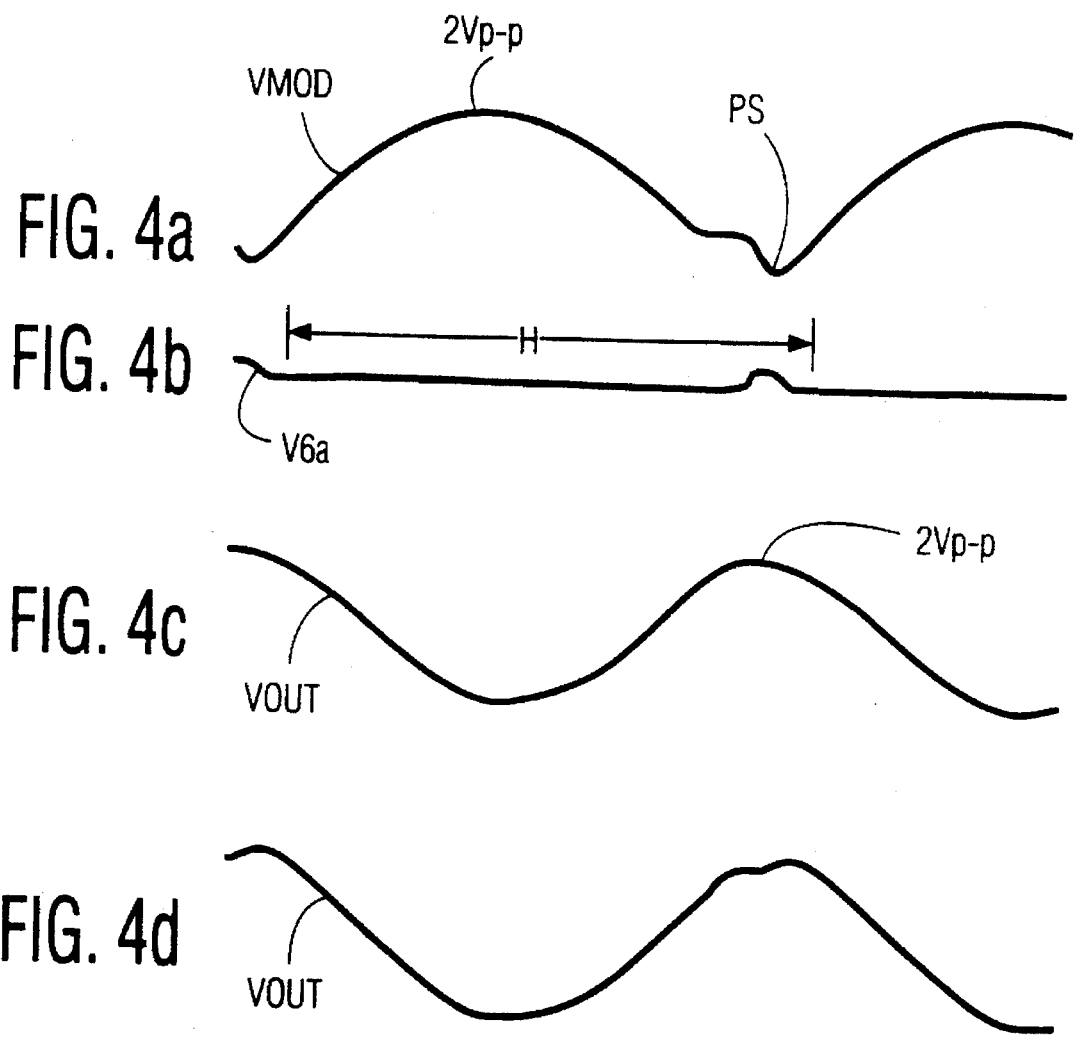

BEAM LANDING LOCATION ERROR CORRECTION ARRANGEMENT

The invention relates to a correction arrangement for correcting a beam landing location error in a cathode ray tube (CRT).

In some prior art projection television receivers, a correction signal such as a horizontal rate parabola signal is generated. The parabola is amplitude-modulated at a vertical rate sawtooth manner to produce a so-called bow-tie signal. The bow-tie signal is coupled via an amplifier to an auxiliary coil such as a vertical convergence auxiliary coil of a beam landing location error correction arrangement for correcting, for example, a vertical convergence error.

In the vicinity of the end of horizontal retrace, the slope of the current in the auxiliary coil changes its polarity. During a beginning portion of a horizontal trace, the rate of change or slope of the current in the auxiliary coil is, typically, at a maximum magnitude. During the immediately preceding retrace, inadequate or limited response time with respect to the horizontal rate parabola signal in the amplifier that drives the auxiliary coil may produce "bending" of horizontal scan lines that also produces a misconvergence error in the vertical direction at the extreme left side of the displayed image. The extent of "bending" increases close to the top and bottom ends of the displayed image.

In U.S. Pat. No. 5,218,275 in the name of Truskalo, entitled, Beam Landing Location Error Correction Arrangement, a horizontal rate parabolic voltage generator is responsive to a reset pulse at the horizontal rate for generating a horizontal rate parabolic voltage that includes a pulse portion in the vicinity of horizontal retrace. The parabolic voltage is coupled to an auxiliary coil mounted on a cathode ray tube to produce a vertical convergence error correction current. The pulse portion compensates for a slow response time in an amplifier that drives the auxiliary coil.

The pulse portion controls the response of the amplifier during a beginning portion of a trace interval of the deflection current. The pulse portion compensates for inadequate response time of the amplifier to provide a sufficiently large slope of the current in the auxiliary coil.

In the Truskalo arrangement, the pulse portion is produced by detecting zero crossing in a horizontal deflection current that occurs at the center of trace. The signal that is produced by the zero crossing detection is applied via a pair of one-shot multivibrators to produce the aforementioned pulse portion. Thus, the pulse portion is referenced to the detected trace, zero crossing portion.

It may be desirable to apply a retrace pulse for producing the aforementioned pulse portion, such that the need for detecting zero crossing in the trace portion is eliminated; thereby, the circuitry is advantageously simplified.

A video display deflection apparatus, embodying an aspect of the invention, includes a cathode ray tube including an evacuated glass envelope. A display screen is disposed at one end of the envelope and an electron gun assembly is disposed at a second end of the envelope. The electron gun assembly produces an electron beam that forms a raster at electron beam landing locations on the screen. A main horizontal deflection winding and a main vertical deflection winding are disposed on a neck of the cathode ray tube for producing a main deflection field in a beam path of the electron beam. The deflection field varies in a manner to vary the electron beam landing location. A horizontal deflection current is generated in the horizontal deflection winding and a first retrace pulse signal is generated during horizontal retrace. A correction signal is generated. The correction signal generating arrangement is responsive to the first retrace pulse signal for introducing a pulse portion in the correction signal. The first retrace pulse signal is utilized for controlling the pulse portion during an interval that is determined by the first retrace pulse signal. An amplifier is responsive to the correction signal for generating a current in an auxiliary deflection coil disposed on the neck to correct for a beam landing error in accordance therewith.

FIGS. 3a–3c illustrate waveforms useful for explaining the way the pulse portion of FIG. 2 is generated; and FIGS. 4a–4d illustrate additional waveforms useful for explaining the way the pulse portion is inserted in the bow-tie shaped signal of the modulator of FIG. 2.

Figure 1:
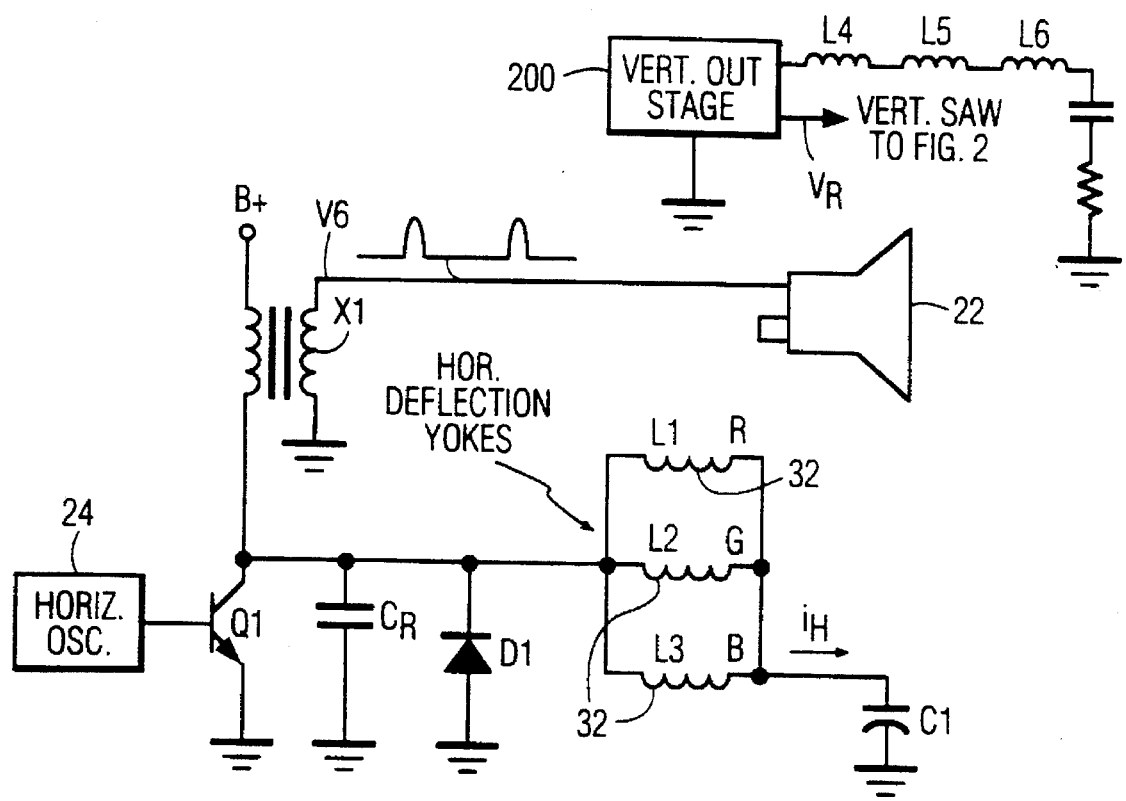
FIG. 1 is a schematic block diagram illustrating the generation of a reset or retrace signal in a horizontal deflection circuit.

In FIG. 1, a CRT 22 of a projection television receiver produces an electron beam. Horizontal and vertical deflection coils cause the beam to scan beam landing locations across the screen of CRT 22, in horizontal lines which are vertically displaced to form a raster. A horizontal oscillator 24 is coupled to a horizontal output transistor Q1 having a collector that is coupled to a horizontal flyback transformer X1. The emitter of transistor Q1 is grounded. A signal is applied to the base of transistor Q1 to cause transistor Q1 to switch at the frequency fH and to conduct from a B+ power supply of +140 volts through transformer X1. Transformer X1 may have various secondary windings for producing, for example, a flyback, filament output pulse V6, during retrace, as shown generally in FIG. 1.

The collector of transistor Q1 is coupled to a damper diode D1, a retrace capacitor $C_R$ and a parallel arrangement of main horizontal deflection coils L1, L2 and L3 which produce horizontal deflection fields for scanning the beams over a repetitive scanning period in each CRT of the receiver. A trace capacitor C1 is coupled in series with a parallel arrangement of the horizontal deflection coils. A ramp, horizontal deflection current iH causes the electron beam to scan from a maximum deflection at one side of the screen, through zero deflection at the center of the screen to maximum deflection of opposite polarity at the opposite side of the screen.

In the projection television receiver, horizontal deflection coils L1, L2 and L3 are coupled in parallel, one for each of the red, blue and green CRTs of the projection television receiver. However, in a television apparatus having only one horizontal deflection coil, only one coil would be used. Main vertical deflection coils L4, L5 and L6 provide vertical deflection in the CRTs. The horizontal scan frequency is fH, or about 15,734 Hz, having a period of 63.5 microseconds.

Figure 2:
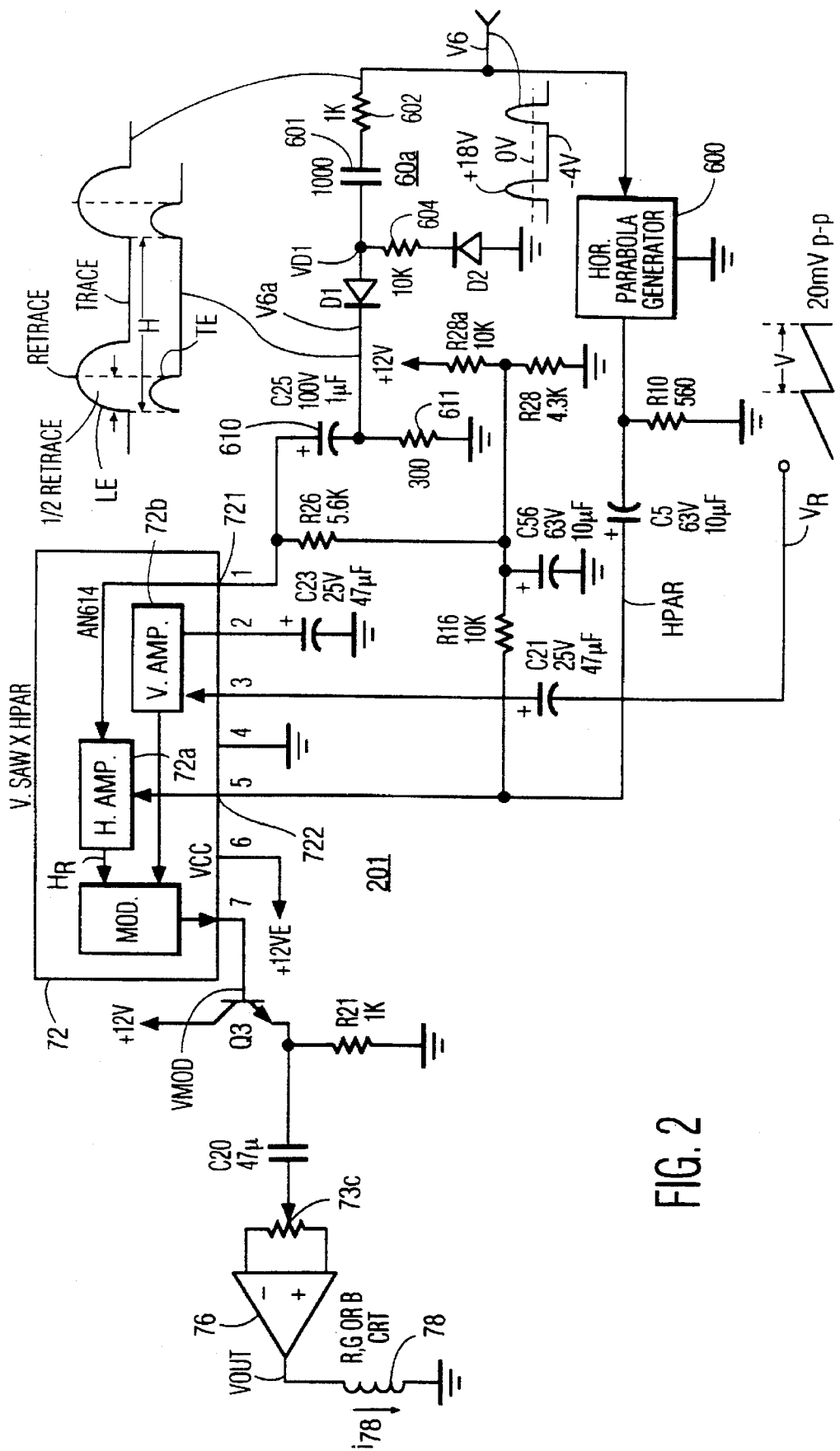
FIG. 2 is a schematic diagram, illustrating a modulator responsive to a vertical rate sawtooth signal, to a horizontal rate parabola signal and to the reset or retrace signal of FIG. 1 for generating a vertical rate bow-tie shaped signal having a pulse portion during each horizontal period, according to the invention.

FIG. 2 illustrates a horizontal parabola generator 62 responsive to retrace pulse V6 of FIG. 1 and a pulse inserting network 60a, embodying an aspect of the invention. FIG. 2 also illustrates a vertical convergence arrangement 201. FIGS. 3a–3c illustrate waveforms useful for explaining the operation of section 60a of FIG. 2. Similar symbols and numerals in FIGS. 1, 2 and 3a–3c indicate similar items or functions.

In network 60a of FIG. 2, retrace pulse V6 of FIG. 3a that includes a leading edge portion LE is applied to a resistor 602 of FIG. 2. Leading edge LE corresponds to the beginning of horizontal retrace. Resistor 602 limits surge currents that may occur during arcing. Because of the fast rise time of leading edge LE of pulse V6, it is applied without significant attenuation via a differentiating capacitor 601 and a rectifying diode D1 to produce a pulse V6a of FIG. 3b across a resistor 611 of FIG. 2. Resistor 611 determines an amplitude of pulse V6a. A resistor 604 is coupled in series with a diode D2 to form a circuit branch that is coupled between a junction terminal, coupled between diode D1 and capacitor 601, and ground. Resistor R3 provides a recharge current of capacitor 601, during trace.

The waveform of a voltage VD1, at a junction terminal between capacitor 601 and resistor 604, is shown in FIG. 3c. During the first half of retrace and close to the peak of pulse V6 of FIG. 2 the rate of change of pulse V6 significantly decreases. Consequently, the voltage developed in capacitor 601 causes pulse V6a across resistor 611 to decrease rapidly. The result is that a trailing edge TE of pulse V6a of FIG. 3b begins prior to the peak or the center of the width of pulse V6 of FIG. 3a. In comparison, the leading edge of pulse voltage V6a of FIG. 3b occurs simultaneously with the leading portion of pulse V6 of FIG. 3a. Thus, pulse V6a of FIG. 3b is a substantially narrower pulse than pulse V6 of FIG. 3b. Following trailing edge TE of FIG. 3b, capacitor 601 of FIG. 2 is discharged in preparation for the next retrace pulse V6.

In accordance with an aspect of the invention, advantageously, narrower pulse V6a is produced from retrace pulse V6. In contrast, in the Truskalo patent, the trace and not the retrace portion is utilized for generating the pulse. Pulse V6a is produced using only passive elements such as resistors 602 and 604, capacitor 601 and diodes D1 and D2. In this way, the circuitry is simplified.

Pulse voltage V6a at the cathode of diode D1 is AC-coupled via capacitor 610 to an input 721 of an amplifier 72a. Amplifier 72a receives also a horizontal rate parabola signal HPAR at an input 722 of amplifier 72a. Signal HPAR is produced in a conventional manner by a horizontal parabola generator 600. Signal HPAR is coupled from generator 600 via a capacitor C5. One of inputs 721 and 722 is an inverting input terminal and the other one is a noninverting input terminal of amplifier 72a. DC biasing for input terminals 721 and 722 is provided by a voltage divider formed by a resistor R28a and a resistor R28. The DC biasing voltage developed across resistor R28 and a filter capacitor C56 is coupled to inputs 721 and 722 via a resistor R26 and a resistor R16, respectively. An output of amplifier 72a is coupled to a conventional modulator or vertical convergence correction circuit 72.

A vertical sawtooth signal $V_R$, obtained from a vertical output stage 200 of FIG. 1, is coupled via a capacitor C21 to an amplifier 72b of vertical convergence correction circuit 72. Amplifier 72b operates as a differential amplifier in which capacitor C21 is coupled to one of the inverting and noninverting input terminals and a capacitor C23 is coupled to the other one. DC biasing in input pins 2 and 3 of amplifier 72b is supplied internally in the circuit in a manner not shown.

An output signal VMOD of circuit 72 that is obtained by modulating signal HPAR with signal VR is coupled via an emitter follower transistor Q3 and a conventional power amplifier 76 to an auxiliary vertical convergence coil 78 of the CRT. Other waveforms that may also be coupled via amplifier 76 to coil 78 are not shown for simplification purposes. The waveform of a horizontal parabola current $i_{78}$ in coil 78 varies in a vertical rate parabola manner to vary a waveform of the magnetic field, produced by coil 78 for providing vertical convergence. Amplifier 76 operates as a voltage-to-current converter. The operation of amplifier 76 may be similar to that described in U.S. Pat. No. 4,961,032 in the name of Rodriguez-Cavazos, entitled, DUAL POWER SOURCE OUTPUT AMPLIFIER.

FIGS. 4a–4d illustrate additional waveforms useful for explaining the operation of the arrangement of FIG. 2 that were obtained by simulation. Similar symbols and numerals in FIGS. 1, 2, 3a–3c and 4a–4d indicate similar items or functions.

FIG. 4a illustrates the waveform of signal VMOD of FIG. 2 during a horizontal period H that occurs at the bottom of the raster. FIG. 4b illustrates the corresponding waveform of pulse V6a of FIG. 2.

Pulse forming network 60a of FIG. 2, embodying an inventive feature, is used for inserting at a predetermined magnitude into the waveform of signal VMOD, a pulse PS of FIG. 4a, produced during retrace. The effect of pulse PS on the current in coil 78 of FIG. 2 is to speed-up the response time in amplifier 76 to signal VMOD of FIG. 4a. FIG. 4c illustrates the waveform of an output voltage VOUT of amplifier 76 of FIG. 2 in an example where pulse PS of FIG. 4a is not introduced. FIG. 4d illustrates the waveform of voltage VOUT when pulse PS of FIG. 4a is introduced in accordance with the invention.

Overshoot pulse PS compensates for the slow response time of amplifier 78 of FIG. 1 and makes signal VOUT of FIG. 4d at the beginning of horizontal trace symmetrical to that at the end of trace. Thereby, amplifier 76 of FIG. 2 does not introduce a distortion in signal VOUT of FIG. 4d. Because of the slow response time of amplifier 76 of FIG. 2, signal VOUT of FIG. 4c could have been distorted at the beginning of horizontal trace. By speeding-up the response time in amplifier 76, convergence error is reduced, as described in U.S. Pat. No. 5,218,275 in the name of Truskalo entitled, Beam Landing Location Error Correction Arrangement.

I claim:

1. A video display deflection apparatus, comprising:

a cathode ray tube including an evacuated glass envelope, a display screen disposed at one end of said envelope and an electron gun assembly disposed at a second end of said envelope, said electron gun assembly producing an electron beam that forms a raster at electron beam landing locations on said screen;

a main horizontal deflection winding and a main vertical deflection winding disposed on a neck of said cathode ray tube for producing a main deflection field in a beam path of said electron beam that varies in a manner to vary the electron beam landing location;

means for generating a horizontal deflection current in said horizontal deflection winding and a first retrace pulse signal, during horizontal retrace;

a differentiator for differentiating said first retrace pulse signal to generate a second retrace pulse signal;

means for generating a correction signal, said correction signal generating means being responsive to said second retrace pulse signal for introducing a pulse portion in said correction signal, such that said second retrace pulse signal is utilized for controlling said pulse portion during an interval that is determined by said second retrace pulse signal; and an amplifier responsive to said correction signal for generating a current in an auxiliary deflection coil disposed on said neck to correct for a beam landing error in accordance therewith.

2. An apparatus according to claim 1 wherein said pulse portion is applied to said auxiliary deflection coil current for controlling said auxiliary deflection coil current at a beginning of a trace interval.

3. An apparatus according to claim 1 wherein said second retrace pulse signal is narrower than said first retrace pulse signal.

4. An apparatus according to claim 1 wherein said differentiator comprises a capacitor.

5. An apparatus according to claim 1 wherein said differentiator generates said second retrace pulse signal without using active circuit elements.

6. An apparatus according to claim 1 wherein said electron gun assembly produces a plurality of electron beams for producing a color image and wherein said correction signal provides for convergence.

7. A video display deflection apparatus, comprising:
a cathode ray tube including an evacuated glass envelope, a display screen disposed at one end of said envelope and an electron gun assembly disposed at a second end of said envelope, said electron gun assembly producing an electron beam that forms a raster at electron beam landing locations on said screen;
a main horizontal deflection winding and a main vertical deflection winding disposed on a neck of said cathode ray tube for producing a main deflection field in a beam path of said electron beam that varies in a manner to vary the electron beam landing location;
a deflection circuit output stage for generating in said horizontal deflection winding a horizontal deflection current and a first retrace pulse signal, during horizontal retrace;
a correction signal generator for generating a first correction signal at a frequency that is related to a horizontal deflection frequency;
an amplifier responsive to said first correction signal for generating a current in an auxiliary deflection coil disposed on said neck to correct for a beam error in accordance therewith; and
a second signal generator responsive to said first retrace pulse signal for generating a second retrace pulse signal that is coupled to an input of said amplifier to control said auxiliary deflection coil current, during a portion of a horizontal deflection cycle that is substantially closer to horizontal retrace than to a center of horizontal trace, said second retrace pulse signal being generated from said first retrace pulse signal without producing in a signal path between said deflection circuit output stage and said amplifier input, a signal having a leading edge that is phase-advanced with respect to a leading edge of said first retrace pulse signal.

8. An apparatus according to claim 7 wherein second retrace pulse signal and said first correction signal are combined to generate a second correction signal at said input of said amplifier having a pulse portion that is controlled by said second retrace pulse signal.

* * * * *